(No Model.)
C. M. FRENCH.
MANUFACTURE OF PLOW BLADES.
No. 356,530. Patented Jan. 25, 1887.
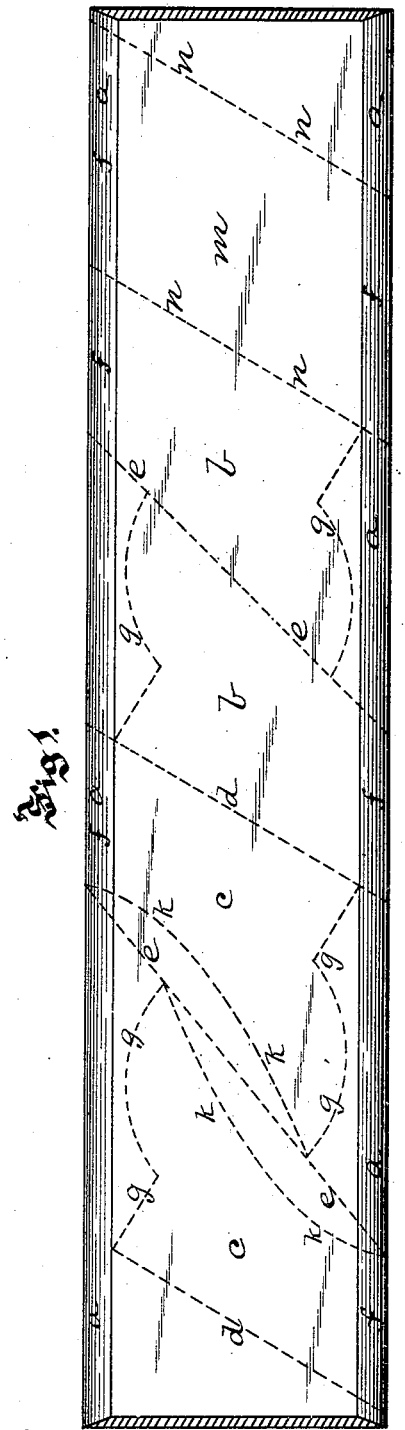
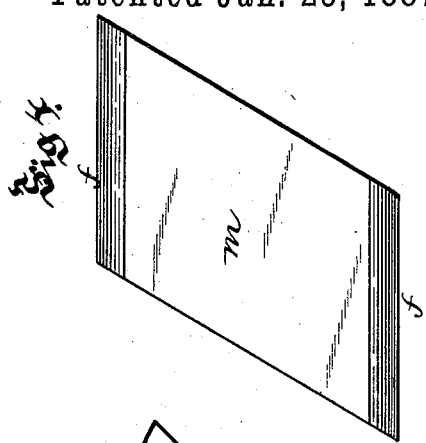
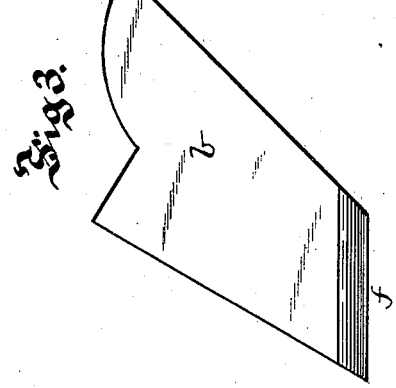
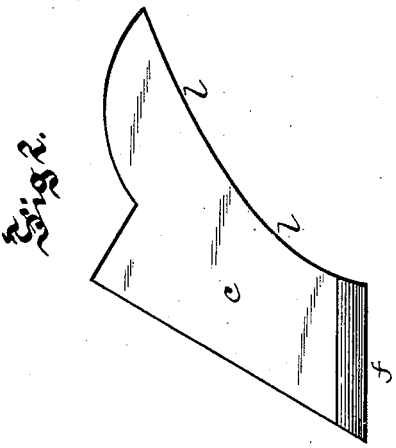
Witnesses:
J. N. Cooke
J. E. Barnes
Inventor.
Charles M. French
By James J. Kay
Attorney

UNITED STATES PATENT OFFICE.

CHARLES M. FRENCH, OF PITTSBURG, PENNSYLVANIA.

MANUFACTURE OF PLOW-BLADES.

SPECIFICATION forming part of Letters Patent No. 356,530, dated January 25, 1887.

Application filed July 17, 1886. Serial No. 208,273. (No model.)

*To all whom it may concern:*

Be it known that I, CHARLES M. FRENCH, of Pittsburg, in the county of Allegheny and State of Pennsylvania, have invented a new and useful Improvement in the Manufacture of Plow-Blades; and I do hereby declare the following to be a full, clear, and exact description thereof.

My invention relates to the manufacture of plow-blades, these blades being of different forms, according to the special use to which they are to be put, and having cutting-edges on the body of the blade to shear the earth before it is turned over by the body of the blade, the plow-blades of this construction being specially used in the southern trade. These blades have heretofore been made by cutting the blank from a slab or plate of iron or steel, and subsequently reheating the edge of the blank and plating out on an anvil or under a steam-hammer the beveled cutting-edge thereon, the plow-blade blanks so formed being subsequently heated and bent or curved to shape. In this method of manufacture it required a separate heating to form the bevel or cutting edge on the blank, and when the edge was formed by hammering it could not be formed accurately, it being necessary to "edge" the plate on an emery-wheel to straighten the cutting-edge of the blank and to remove any "flash" or fin formed in the hammering or swaging of the blank. It was also found that in case there was a slight flaw in the blank, formed in some cases by the shearing or cutting of the metal, this flaw was liable to open and form a seam, thus rendering the blank unfit for use. In the reheating of the blank for this purpose there was also a waste of metal in scaling and a liability of "burning" the blank by raising it to too high a heat. The steel cutting-edges for such blades, commonly termed "plow-lays," have been made by rolling a double bevel in the center of a slab and subsequently slitting the slab at its thinnest point to form the plow-lays, which were afterward welded to the blades; but in this case the cutting-edge of the plow-lay was rendered rough and imperfect by the slitting of the blank, and the objections to the above-described manufacture were only partially overcome, while it was necessary to weld the plow-lay to the blade, and as the cutting-edge was only rolled on one side of the slab such a slab could not have been employed to advantage in cutting the blades therefrom.

The object of my invention is to overcome these objections to the present method of making these blanks; and it consists in rolling a slab with both edges thereof beveled or scarfed, and cutting the blanks therefrom in such manner as to utilize both edges in forming the cutting-edges of the plow-blades.

It also consists in rolling the slab with bevels along both edges and cutting the blanks from the slab in such a manner that the beveled edge on one side of the blank forms the cutting-edge of one blank and the beveled edge of the other side of the blank forms the cutting-edge of the next blank, much metal being saved in this manner where the plow-blades are of peculiar shape.

To enable others skilled in the art to make and use my invention, I will describe the same more fully, referring to the accompanying drawings, in which—

Figure 1 is a plan view of a slab, showing in dotted lines the manner of cutting the blanks therefrom, and Figs. 2, 3, and 4 are like views of blanks cut from the slab.

Like letters of reference indicate like parts in each.

The slabs from which the blanks are formed are rolled in the usual manner, except that both edges of the slab are formed beveled or scarfed, as at $a$, this bevel or scarf being generally formed on one side of the slab, as shown, as it is generally desired to form the cutting-edge only on one side of the finished plow-blade. After the rolling of the slab the blanks are sheared therefrom, the lines on which the blanks are sheared being illustrated in the drawings by dotted lines. The plow-blade blanks $b$ $c$ (shown in Figs. 2 and 3) are two forms of what are known as "turning shovel-blades," these blades being cut from the slab in the manner shown in Fig. 1, the slab being first cut at $d$ $d$ and subsequently cut at a more acute angle at $e$, and the blanks formed being narrower at their cutting-edges $f$ than in the upper portion of the blank, being cut from the slab in the manner shown in order to save metal, the one cutting-edge, $a$, of the slab forming the cutting-edge $f$ of one blank and the other cutting-edge of the slab forming the cutting-edge of the other blank, the metal at the top of the blank being sheared off on the line $g$, and by so cutting the blank and utilizing both beveled or scarfed edges of the slab a large saving of metal is obtained, while at the same time I am enabled to form the cutting-edges of the blank from the bevel edges of the slab.

The blanks $b$ have straight edges formed by the shearing along of the line $e$, while the blanks $c$ differ from the blanks $b$ in that after the shearing along of the line $e$ the blank is further sheared, as at $k$, to form a curved edge, $l$, to the blank, the metal cut away along the line $k$ being wasted, but this form $c$ of shovel-blade is desirable for certain classes of work.

The plow-blade $m$ (shown in Fig. 4) is what is termed a "reversible mold-board," this mold-board having two cutting-edges, $f$, and being formed by cutting across the rolled slab, as at $n$, this form of mold-board requiring no shearing further than the cutting of the same from the slab, and the cutting-edges $f f$ along both ends of the blade being formed by the beveled or scarfed edges $a\ a$ on both edges of the slab.

After the blanks have been cut in the manner above described, the finished blanks provided with bevel cutting-edges $f$ are obtained, these beveled cutting-edges being formed, as above described, from the rolled, beveled, or scarfed edges of the slab, and the heating of the blank to forge thereon the bevel or cutting edge is entirely dispensed with, while at the same time there is no cutting or slitting of the metal to form the edge, and though there may be a slight flaw in the edge of the blank there is no liability of the opening of the same, as occurs where the blank is reheated and the edge plated out or the slab is slit to form the edge, so that the loss by the formation of imperfect blanks is reduced to a minimum, and there is no liability of the burning of the blank by overheating, and the grinding away of any flash or fin is avoided, and there is no loss by the scaling of the blank. At the same time a much more perfect and even cutting-edge is obtained, and one which can be ground to a sharp edge at a less cost than the ordinary hammered edge on the blank or edge partially rolled and then cut, which cannot be formed so perfect as where the edge is entirely rolled to shape, and by cutting the blanks so as to employ the cutting-edges thereof alternately a large saving of metal is obtained. To finish the plow-blades all that is necessary is to punch the holes therein and curve them to shape, the heat required in curving or bending the blank to shape being low and not in any way affecting the metal of the blank.

By my improved method of manufacture I am thus enabled to form more perfect blanks, obtaining a true and even edge, and to effect a large saving of metal in forming them, as well as all loss occasioned by the formation of imperfect blanks.

What I claim as my invention, and desire to secure by Letters Patent, is—

1. The herein-described method of forming plow-blade blanks, consisting in rolling a slab with both edges thereof beveled or scarfed and cutting the blanks therefrom in such manner as to utilize both beveled edges in forming the cutting-edges of the plow-blades, substantially as and for the purposes set forth.

2. The herein-described method of forming plow-blade blanks, consisting in rolling a slab with its edges beveled or scarfed and cutting the blanks therefrom in such manner that the beveled edge on one side of the slab forms the cutting-edge of one blank, and the beveled edge on the other side of the slab forms the cutting-edge of the next blank, substantially as and for the purposes set forth.

In testimony whereof I, the said CHARLES M. FRENCH, have hereunto set my hand.

CHARLES M. FRENCH.

Witnesses:
 JAMES I. KAY,
 J. N. COOKE.